United States Patent [19]
Kelly et al.

[11] Patent Number: 6,010,074
[45] Date of Patent: Jan. 4, 2000

[54] CONTACTLESS PROXIMITY AUTOMATED DATA COLLECTION SYSTEM AND METHOD WITH COLLISION RESOLUTION

[75] Inventors: Guy M. Kelly, La Jolla; Kevin J. Page, Del Mar; Don P. Plum; Joseph V J Ravenis, II, both of San Diego, all of Calif.

[73] Assignee: Cubic Corporation, San Diego, Calif.

[21] Appl. No.: 08/825,940

[22] Filed: Apr. 1, 1997

Related U.S. Application Data

[60] Provisional application No. 60/014,444, Apr. 1, 1996.

[51] Int. Cl.[7] .................................................. G06K 19/06
[52] U.S. Cl. .......................................... 235/492; 235/382
[58] Field of Search .................................. 235/492, 382, 235/384

[56] References Cited

U.S. PATENT DOCUMENTS

| | | | |
|---|---|---|---|
| 4,463,250 | 7/1984 | McNeight et al. | 235/385 |
| 4,514,815 | 4/1985 | Anderson | 364/478 |
| 4,650,981 | 3/1987 | Foletta | 235/449 |
| 4,692,604 | 9/1987 | Billings | 235/493 |
| 4,818,855 | 4/1989 | Mongeon et al. | 235/440 |
| 4,822,990 | 4/1989 | Tamada et al. | 235/492 |
| 4,827,115 | 5/1989 | Uchida et al. | 235/492 |
| 4,899,036 | 2/1990 | McCrindle et al. | 235/380 |
| 4,918,416 | 4/1990 | Walton et al. | 235/497 |
| 5,191,192 | 3/1993 | Takahira et al. | 235/375 |
| 5,283,422 | 2/1994 | Storch et al. | 235/375 |
| 5,310,999 | 5/1994 | Claus et al. | 235/384 |
| 5,382,778 | 1/1995 | Takahira et al. | 235/380 |
| 5,434,572 | 7/1995 | Smith | 342/44 |
| 5,477,215 | 12/1995 | Mandelbaum | 340/825.34 |
| 5,479,172 | 12/1995 | Smith et al. | 342/51 |
| 5,500,650 | 3/1996 | Snodgrass et al. | 342/42 |
| 5,521,601 | 5/1996 | Kandlur et al. | 342/44 |
| 5,541,583 | 7/1996 | Mandelbaum | 340/825.54 |
| 5,661,286 | 8/1997 | Fujioka | 235/382 |
| 5,825,875 | 10/1998 | Ugon | 380/4 |

FOREIGN PATENT DOCUMENTS

WO 91/14237  9/1991  WIPO .

*Primary Examiner*—Michael G. Lee
*Assistant Examiner*—Diane I. Lee
*Attorney, Agent, or Firm*—Brown, Martin, Haller & McClain

[57] ABSTRACT

A collision resolution system and method for enhanced non-contact automated data collection. The data collection system generally includes a plurality of portable fare tags or token ("smart") cards and a stationary target terminal. Each tag exchanges a series of messages with the target terminal to establish a communication link for the transfer of financial or other data. Concurrently, each tag and the target terminal process the messages to provide collision resolution, thereby ensuring that only one tag, at any instance, establishes the communication link with the target.

38 Claims, 3 Drawing Sheets

CONTACTLESS PROXIMITY AUTOMATED DATA COLLECTION SYSTEM AND METHOD WITH COLLISION RESOLUTION

RELATED APPLICATION

This application is based upon and claims priority to United States Provisional Application Ser. No. 60/014,444, filed Apr. 1, 1996, the disclosure of which is incorporated herein by reference.

BACKGROUND OF THE INVENTION

1. Field of the Invention

This invention generally relates to non-contact automated data collection systems in which a portable token card or fare tag, commonly referred to as a "smart card," is used with a stationary target terminal to exchange financial and other data in a mass-transit fare transaction system. More particularly, the invention relates to an improved data collection system having collision resolution features to prevent more than one fare tag from establishing a communication link with a single target.

2. Description of the Related Art

Smart card technology has been effectively used in mass-transit systems. In such an application, the smart card retains a fare value representative of funds available for use by its holder. As the smart card holder uses his card for transportation services, value is subtracted from the smart card in accordance with the applicable fare, or added in exchange for proper consideration.

The utilization of smart card technology in mass-transit applications reduces waste and increases efficiency by replacing paper ticket, mechanical coin, and token reading devices. Waste is reduced through the elimination of fare tickets. Efficiency is enhanced by the increased transaction speed and the ease of use of automated non-contact data collection systems for admittance to and departure from the transit system. A typical smart card transaction takes place within a 100 millisecond time period, roughly seven times faster than the time it takes to pass a paper ticket through a standard mechanical transport. For admittance or departure, the smart card need be merely presented in the proximity of the target provided in the stationary target terminal for the fare transaction to take place. Moreover, since data is transmitted via a radio frequency ("RF") field, no physical contact between a smart card and target is required. The smart card may even be retained in a storage area, such as a purse or wallet, as long as it is presented in the proximity of the target.

The capabilities of the smart card system have also been exploited in multi-modal mass-transit systems. In such a system, a smart card is designed to integrate payment schemes for various forms of ground transportation and related services. For instance, smart card technology has been utilized as a common means of payment for local rail, bus, and parking services provided by a particular local transit system. One such system developed by the assignee of this application is disclosed in International Application Number PCT/US92/08892, entitled "Non-Contact Automatic Fare Collection System," filed Oct. 19, 1992, and published May 13, 1993 as WO 93/09516.

A demonstration system generally applying the teachings of this application is currently operating in the Washington Metro Area Transit Authority (WMATA) mass-transit system for rail service, ground transportation (buses), and parking lots. In the WMATA system currently in use, fare data is transmitted between the stationary target terminal and a smart card, referred to herein as a fare tag, via a RF field. A standard target terminal consists of a target and a remotely located controlling computer. The target includes a modulator/demodulator and an antenna designed to transmit and receive, via an RF field with a carrier signal frequency of 2 MHz, a message modulated upon the carrier. During operation, the target emits a continuous RF field designed to evoke a response from a fare tag located in the general proximity of the target. Once a fare tag is brought in range, it is powered by the target's RF transmission and its responds with a message to the target. The target antenna receives the RF transmission from the responding fare tag, demodulates the message and conveys it to the device to which it is connected. The device determines if the message it has received is in the proper message format and, if so, it responds with a message. The fare tag receives the response and determines if the response is in the proper message format. If the response is in the proper message format, the fare tag responds by communicating with the controlling computer, and the appropriate fare data is read from the tag. The controlling computer then calculates the resulting fare value and that value is transferred and written to the tag's memory.

This demonstration system did not include any means or method for resolving message collisions because, as a result of its low signal power transmission characteristics, the target could only power one fare tag at a time. If two tags were presented in the proximity of the target, neither tag's internal circuitry would reach the required threshold voltage to generate and transmit a message. However, at higher power levels, message collisions can occur if more than one fare tag is presented in the proximity of a target and those fare tags are activated. Once activated, the tags simultaneously transmit information to the target. The simultaneously transmitted information collides and creates a signal which the target cannot recognize. Accordingly, there is a need for an effective collision resolution system that will prevent message collisions from multiple tags in higher power systems.

SUMMARY OF THE INVENTION

Applicant has met this need by providing a system for a method of resolving message collisions in a non-contact automated data collection system having a target configured to receive message transmissions from an electronic fare tag and convey the message transmissions to a microcontroller. According to the method, messages originating from more than one fare card, if simultaneously conveyed to the microcontroller, are processed to determine that the simultaneously received messages do not conform to a valid message form. The microcontroller then generates and transmits an invalidity indication message indicating that the messages simultaneously conveyed to the microcontroller do not conform to a valid message form. The invalidity indication message effects each of the plurality of tags to transmit a new message similar to the first message after a preselected period of time, where the preselected period of time is determined for each of the tags individually. The first new message, which is transmitted by the tag with the shortest preselected time period, is conveyed to the microcontroller and processed. In response, the microcontroller generates and transmits a validity indication message indicating that the first new message to the microcontroller conforms to a valid message form. The tags receive the validity indication message, and all but the tag which transmitted the first new message discontinue transmissions until they receive an appropriate message.

DETAILED DESCRIPTION OF THE PREFERRED EMBODIMENTS

The invention is described herein in an electronic fare collection system for rapid transit or toll applications. However, it should be apparent that the principles of invention may have broader applicability to other systems in which non-contact data exchange is utilized.

The improved target of the invention may be used advantageously in a fare collection system similar to that described in WO 93/09516 discussed above, the disclosure of which is incorporated by reference herein. Thus, only the features of the invention that differ from the system disclosed in WO 93/09516 or that are required to understand the collision resolution protocol of the invention are described in detail herein.

Figure 1:
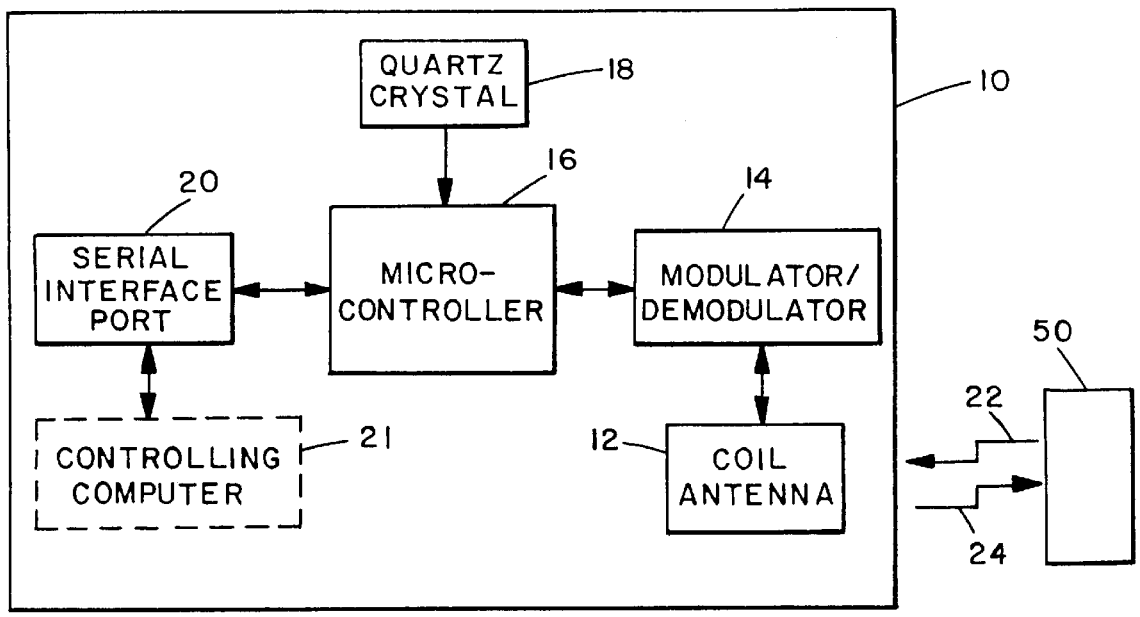
FIG. 1 is a block diagram representing an improved target constructed according to the principles of the invention in communication with a schematically shown fare tag.

In the illustrated embodiment, the target 10 of the invention is shown schematically in FIG. 1. The target 10 consists of an coil antenna 12, a modulator/demodulator 14, a microcontroller 16, a ceramic resonator or quartz crystal 18, and a serial interface port 20. Microcontroller 16 has an internal clock (not shown) whose frequency is determined by the quartz crystal 18. Additionally, a controlling computer 21 is coupled to the serial interface port 20. Controlling computer 21 is preferably remotely positioned, although it may be located directly on the target itself. Any known, commercially available parts may be employed for these components, but the following parts are preferred: a P5876820 microcontroller manufactured by Dallas Semiconductor; a RS-232 interface manufactured by Linear Tech, a 14.7436 MHz quartz crystal manufactured by ECS Inc., and a coil antenna consisting of a 3 $\mu$Hy, 1.0 A inductor. In a transit application, controlling computer 21 will likely be in the entrance and/or exit gates, and any vending machines. Both microcontroller 16 and controlling computer 21 have software residing therein to assist in the control of various operations of target 10, including the administration of a communications protocol between the target 10 and a fare tag 50. During operation, messages and data are transmitted to the target 10 through RF field 22, and from the target 10 via RF field 24. Preferably, the RF field is modulated at 115.2 KBaud. However, the RF field is not limited to such a modulation frequency and other frequencies may be used as will be appreciated by those of ordinary skill in the art.

Incoming RF fare tag messages and data 22 transmitted to the target 10 from the fare tag 50 are received by the coil antenna 12. Once received, an incoming fare tag messages or data 22 is conveyed to modulator/demodulator 14 for demodulation, and the incoming fare tag message is conveyed to the microcontroller 16, whereupon, depending on the message type, it is either processed or relayed through the serial port interface 20 to the controlling computer 22. The microcontroller 16 processes data and messages in accordance with the application it has been configured to achieve. Likewise, controlling computer 21 is configured to process data and messages in accordance with its software. The operating speed of clock 18 is sufficient to drive microcontroller 16 to enable a data transmission rate of approximately 115.2 KBaud between target 10 and fare tag 50. However, the invention is not limited to such a transmission rate, and other data transmission rates may also be utilized.

Outgoing RF tag messages and data 24 are transmitted from the target's coil antenna 12 to the fare tag 50. These messages may be conveyed by the microcontroller 16 through the modulator/demodulator 14. Or, messages and data may be conveyed by the controlling computer 21 through the serial port interface 20 to the microcontroller 16, and from microcontroller 16 to the modulator/demodulator 14. The message or data is modulated onto an RF carrier signal by modulator/demodulator 14 to form an outgoing target message. After modulation, the outgoing target message is conveyed to the coil antenna 12, whereupon it is transmitted to fare tag 50 as an outgoing RF target message 24.

Figure 2:
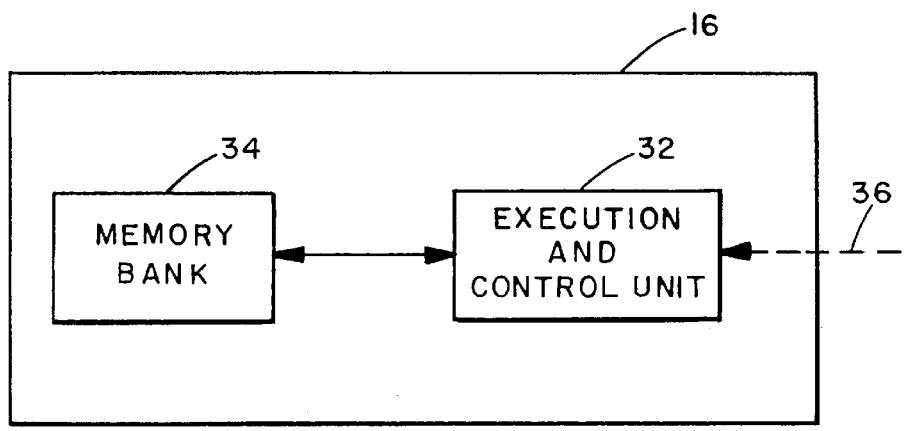
FIG. 2 is a block diagram illustrating the microprocessor in the target of the invention.

The microcontroller 16 of target 10 is depicted in FIG. 2. The microcontroller 16 consists of an execution and control unit 32 and a memory bank 34 containing software, the operation of which will be explained herein. Memory bank 34 may contain any memory know in the art such as RAM, ROM, etc., but EPROM is preferred. In operation, incoming messages 36 are conveyed to the execution and control unit 32, whereupon the incoming messages 38 are processed. The execution and control unit 32 then proceeds under control of instructions read from memory bank 37.

Figure 3:
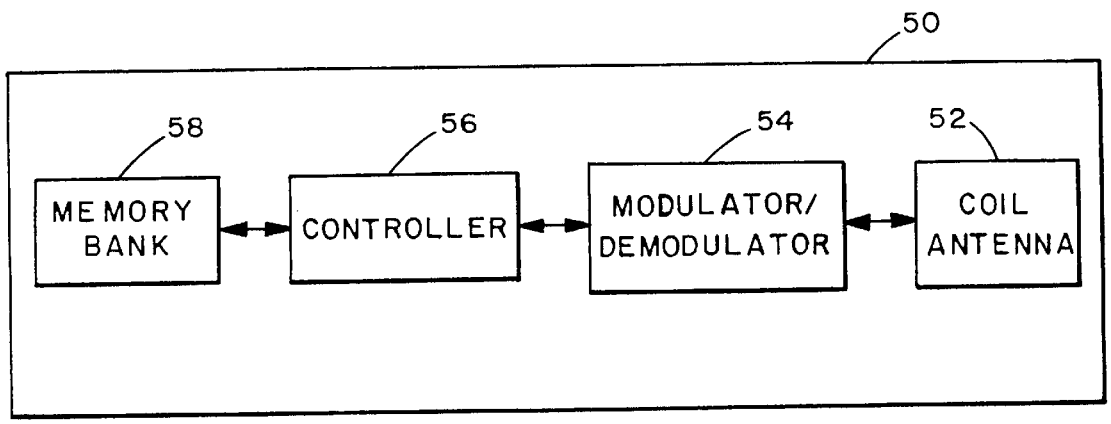
FIG. 3 is a block diagram of a fare tag that may be used in the improved target of the invention.

The fare tag 50 that may be used with the invention is shown in greater detail in FIG. 3. Any fare tag and combination may be used. The fare tag 50 includes a coil antenna 52, a modulator/demodulator 54, and a controller 56. Any known, commercially available devices may be employed, including a custom application specific integrated circuit. Similar to the operation of target 10, messages are transmitted to the fare tag 50 via RF field 24 and from the fare tag 50 via RF field 22. Preferably, the RF field is modulated at 115.2 KBaud, but other frequencies may be used as well.

Incoming RF fare tag messages 22 are transmitted to the fare tag 50 from the target 10 and are received by the coil antenna 52. Once received, the incoming target messages 22 are conveyed to modulator/demodulator 54 for demodulation. The demodulated incoming target message is conveyed to the controller 56 and processed in accordance with the configuration of controller 56.

Outgoing target messages 24 are transmitted from the fare tag's coil antenna 52 to the target 10. These messages originate as data generated by the controller 56, and are conveyed to the modulator/demodulator 54. The message is modulated onto a RF carrier signal by modulator/demodulator 54 to form an outgoing target message. After modulation, the outgoing target message is conveyed to the coil antenna 52, whereupon it is transmitted to target 10 as an outgoing RF target message 24.

A message, either an incoming fare tag message 22 or an outgoing target message 24 transmitted between target 10 and fare tag 50, is generated by either microcontroller 16, controlling computer 21, or controller 56 in accordance with the software or logic residing therein. A message is typically, but not necessarily, approximately 1 byte or greater in length, and may represent control information for controlling the operation of the target 10 or fare tag 50, authentication information to ensure the authenticity of any incoming fare tag message 22 or an outgoing target message 24, message identification information, or other information desired for the particular application in which the invention is employed.

Figure 4:
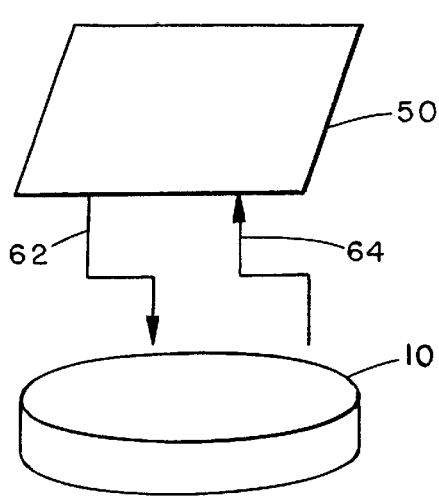
FIG. 4 illustrates a normal communication situation in which a single fare tag is located in the proximity of a target.

Under normal conditions, illustrated by FIG. 4, a single fare tag 50 establishes communication with a single target 10 before fare data is transferred between target 10 and fare tag 50. Data communications between the target 10 and the fare tag 50 will take place at 115.2 kilobits per second, half duplex. However, the invention is not limited to such a communications scheme, other data transmission rates and a full duplex mode of communication may be utilized. Before communication is established with a fare tag 50, target 10 lies in a pulsing mode in which it periodically transmits, under the control of microcontroller 16, a "wakeup" message along transmission path 64 generated by the controlling computer 21. The "wakeup" message contains a sync or start of message, character, a message identification character, and a message digest containing a random number. When a fare tag 50 is presented in the proximity of target 10, it receives the "wakeup" message transmitted by target 10. The fare tag 50 responds, after a random wait period, with a "ping" message. The random wait period of the fare tag 50 is a random multiple, preferably, but not limited to, an integer from 0–7, of a "slot time." The slot time is typically chosen to be greater than the round-trip communication time, from fare tag 50 and back to fare tag 50, of the "ping" and "pong-valid" messages discussed below. A "ping" message may be two characters in length and contains a randomly generated number followed by its duplicate inverted. Although this specification is not limited to such a method, Applicant's preferred method of inverting a number is to change each bit of the number's binary representation from high to low or low to high, depending upon the corresponding original bit's representation. The microcontroller 16 verifies that the "ping" message contains a random number followed by its inverse, and generates a "pong-valid" message. The "pong-valid" message may be one character in length. The fare tag receives the "pong-valid" message, responds with an "imawake" message, and communication between the controlling computer 21 and fare tag 50 is established. Thereafter, fare data residing in the memory of tag 50 is read and transmitted to application 21, which manipulates the fare data in accordance with its software and generates new fare data to be written onto the memory of tag 50. The "imawake" message includes a synchronizing, or start of message, character, a message identification character, and a message digest consisting of random number followed by its duplicate inverted.

Figure 5:
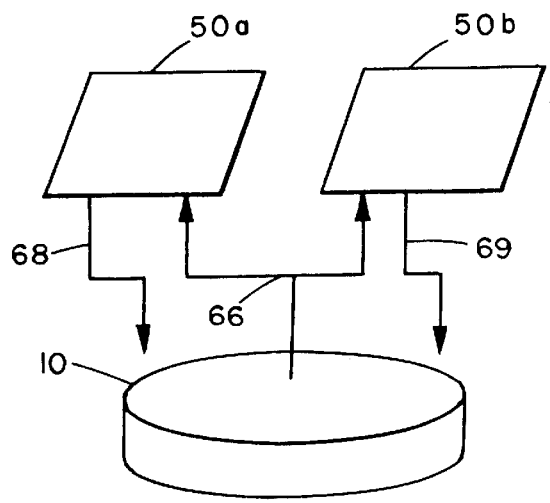
FIG. 5 illustrates a situation in which two fare tags are in the proximity of, and attempting to communicate with, a single target.

FIG. 5 illustrates a tag collision resolution condition. Collisions occur when two fare tags, such as fare tag 50(a) and fare tag 50(b), are presented in the proximity of a target 10 during the establishment of message communication, as discussed above, between the target 10 and either fare tag 50(a) or fare tag 50(b). To avoid such a situation, the microcontroller 16 is programmed to administer the collision resolution protocol of the invention.

Figure 6:
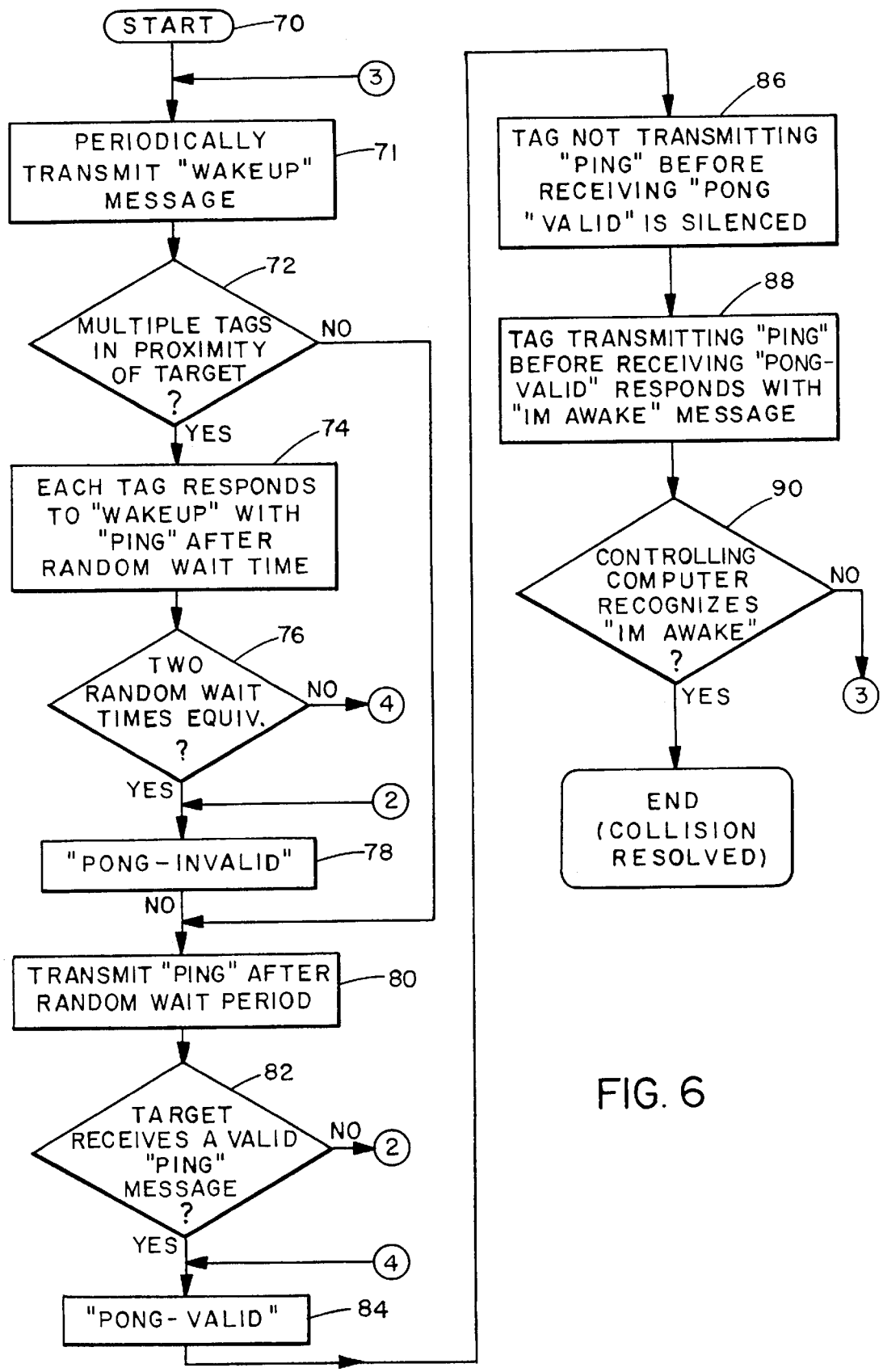
FIG. 6 is a flowchart illustrating the collision resolution communication protocol of the invention.

The collision resolution protocol of the invention is described in conjunction with the flowchart shown in FIG. 6, starting at step 70. At step 71, before communications are established between a target 10 and a fare tag 50, the microcontroller 16 controls target 10 to periodically generate and transmit a data "wakeup" message originated from controlling computer 21, along transmission path 66 (shown in FIG. 5). Progressing to step 72, if multiple fare tags 50(a) and 50(b) are in the proximity of target 10, each fare tag 50(a) and 50(b) responds, as indicated at step 74, after a random wait period, to the "wakeup" message 80 with a "ping" message transmitted along paths 68 and 69, respectively, as shown in FIG. 5. The random wait period of each fare tag, 50(a) and 50(b), is a random multiple, preferably, but not limited to, an integer from 0–7, of a "slot time." The slot time is typically chosen to be greater than the round-trip communication time, from fare tag 50 and back to fare tag 50, of the "ping" and "pong-valid" messages discussed above. The preferred slot time is 0.3 milliseconds. If, at step 76, fare tags 50(a) and 50(b) generate equivalent random wait periods and collide by responding simultaneously and transmit a response in the form of a "ping" message along transmission paths 68 and 69, the target 10 does not receive a coherent "ping" message, which as discussed above should consist of a random number followed by its inverse. The incoherent "ping" message resulting from the simultaneous reception of two "ping" messages, transmitted along paths 62 and 64, is not recognized as valid by the microcontroller 16 of target 10. In the case of non-recognition, microcontroller 16 controls the target 10 such that it transmits, along transmission path 66, a "pong-invalid" message in accordance with step 78. A "pong invalid" message may be one character in length. The colliding fare tags 50(a) and 50(b) receive the "pong-invalid" message which causes, at step 80, each fare tag to once again prepare to transmit a "ping" message along transmission paths 68 and 69, respectively, after its randomly generated random wait period. If, at step 82, the microcontroller 16 of target 10 receives a recognizable "ping" message it immediately replies with a "pong-valid" message, in accordance with step 84, via transmission path 66. Both fare tags 50(a) and 50(b) receive the "pong-valid" message. The fare tag 50(a) or 50(b) which has yet to transmit a "ping" message as a result of its randomly generated wait period, remains silent, as reflected by step 86, after it receives the "pong-valid" message transmitted by target 10. The fare tag 50(a) or 50(b) which did transmit the "ping" message receives the "pong-valid" message generated by microcontroller 16 and engages in communication with the controlling computer 21 by responding with an "imawake" message, illustrated by step 88. Finally, at step 90, if the controlling computer 21 does not recognize the "imawake" message transmitted by the chosen fare tag, collision is again assumed and the controlling computer 21 transmits a "wakeup" message to be transmitted by the target 10 periodically, under control of microcontroller 16.

Table I is a table describing, in further detail, one preferred embodiment of the operating program of microcontroller 16 of target 10.

TABLE I

A. Start Program
B. Initialize computer components and program variables (Establish communication mode)
C. Output "wakeup" command periodically
D. Input a responsive message ("ping")
   1. If responsive message ("ping") is valid, output a validity indication ("pong-valid");
      Else,
      (i) output a non-validity indication ("pong-invalid")
      (ii) return to input a responsive message
E. End Table II is a table describing, in further detail, one preferred embodiment of the functional operation or operating program of the controller 56 of tag 50.

TABLE II

A. Start Function or Program
B. Initialize computer components and program variables (Establish communication mode)
C. Input "wakeup" command
D. Generate a random integer
E. Wait for a time period equivalent to a preselected time period multiplied by the random integer
   3. if validity indication ("pong") is input before wait time period has expired, remain silent;
   Else,
    (i) output a responsive message ("ping")
    (ii) input an indication message
      (a) if indication message a validity indication ("pong") output "imawake";
      (b) if indication message a non-validity indication ("pong-invalid") return to generate a random integer
      Else,
       (i) return to input "wakeup" command
F. End Suitable code in any known programming language, or its functional equivalent, can be written by any artisan having ordinary skill in the art. The written code can be transferred to a read-only memory microchip to implement the logic carried out in the collision resolution communication protocol illustrated in Tables I and II and the flowchart of FIG. 6, as is also known by any artisan having ordinary skill in the art.

What is claimed is:

1. A system for providing contactless automated data exchange with collision resolution, comprising:
at least two tags, each of said tags including
means for outputting a first tag message, after a first period of time, in response to a first target message and another first tag message, after a second period of time, in response to a second target message, and
means for outputting a second tag message in response to a third target message; and
a target, including
means for outputting said first target message,
means for determining if said first tag message received by said target is valid,
means for outputting said third target message if said first tag message by said target is valid, and
means for outputting said second target message if said first tag message received by said target is invalid;
wherein each of the first and second periods of time is a random wait period determined by each of said tags and is a random multiple between 0 and 7 of a predetermined slot time having a duration of approximately 0.3 milliseconds and exceeding a round-trip time for transmitting a message between the target and one of the tags.

2. A target for providing contactless proximity automated data exchange and collision resolution with a plurality of tags, comprising:
a target controller, including
means for outputting a first target message,
means for determining if a first tag message received by the target is valid,
means for outputting a second target message if said first tag message received by the target is valid; and
means for outputting a third target message if said tag first message received by the target is invalid, a coil antenna; and
a modulator/demodulator operably connected to said target controller and said coil antenna,
wherein said target messages are modulated by said modulator/demodulator and transmitted by said coil antenna and demodulated by said modulator/demodulator, the modulator/demodulator operating at 115.2 KBaud.

3. A tag for providing contactless proximity automated data exchange and collision resolution with a target, comprising:
a tag controller, including
means for outputting a first tag message, after a first period of time, in response to a first target message and another first tag message, after a second period of time, in response to a second target message, and
means for outputting a second tag message in response to a third target message;
wherein each of the first and second periods of time is a random wait period determined by the tag and is a random multiple between 0 and 7 of a predetermined slot time having a duration of approximately 0.3 milliseconds and exceeding a round-trip time for transmitting a message between the target and one of the tags.

4. The tag of claim 3, wherein the tag is a smart card.

5. A method for providing collision resolution in a non-contact data exchange system including a target and a plurality of tags, the method comprising the steps of:
periodically transmitting a first target message;
transmitting a first tag message, after a random wait period, in response to said target massage;
determining whether said first tag message received by the target is valid,
if said tag message is valid, transmitting a second target message and in response to said second target message transmitting a second tag message; and
if said second messages are invalid, transmitting a third target message and in response to said third target message transmitting another first tag message, after a second wait period,
wherein the random wait period is a random multiple in a range from 0 to 7 of a predetermined slot time approximately 0.3 milliseconds in duration and exceeding a round-trip time for transmitting a message between the target and said plurality of tags.

6. A contactless proximity automated data collection system comprising:
a target; and
two tags, wherein each of the two tags is adapted to:
wait a first random period of time before transmitting a first ping message when a wake-up message is received from the target;
wait a second random period of time before transmitting a second ping message when a pong-invalid message is received from the target; and adapted to transmit an imawake message when a pong-valid message is received from the target; the target adapted to:
transmit the pong-valid message if the first ping message is valid; and
transmit the pong-invalid message if the first or the second ping message is invalid;
wherein each of the first and second random wait period is a random multiple in a range from 0 to 7 of a predetermined slot time approximately 0.3 milliseconds in duration and exceeding a round-trip time for transmitting a message between the target and said plurality of tags.

7. A system in accordance with claim 6, wherein the first and second ping messages each include a random number and a bitwise compliment of the random number.

8. A system in accordance with claim 6, wherein the imawake message includes a start of message character, a message identification character, a random number, and a bitwise compliment of the random number.

9. A system in accordance with claim 6, wherein the wake-up message includes a start of message character, a message identification character and a random number.

10. A system in accordance with claim 6, wherein the pong-valid message includes a validity indication message.

11. A system in accordance with claim 6, wherein the pong-invalid message includes an invalidity indication message.

12. A system in accordance with claim 6 wherein the target is adapted to periodically transmit the wake-up message.

13. A system in accordance with claim 6 further comprising a computer for communicating with the target.

14. A target for providing contactless proximity automated data exchange with a plurality of tags, the target comprising:
    a transmitter adapted to periodically transmit a wake-up message;
    a receiver adapted to receive a first tag message transmitted, after a first random period of time, from at least one of the plurality of tags in response to the wake-up message;
    a target controller adapted to determine if the first tag message is valid;
    wherein the transmitter is further adapted to transmit a pong-valid message if the target controller determines that the first message is valid and adapted to transmit a pong-invalid message if the target controller determines that the first tag message is invalid, the receiver further adapted to receive a second tag message transmitted from one of the plurality of tags in response to the pong-invalid message after a second random period of time;
    wherein each of the first and second the random wait period time is a random wait period determined by each of said tags and is a random multiple between 0 and 7 of a predetermined slot time having a duration of approximately 0.3 milliseconds and exceeding a round-trip time for transmitting a message between the target and said plurality of tags.

15. A target in accordance with claim 14, wherein the first tag message is a ping message including a random number and bit-wise compliment of the random number.

16. A target in accordance with claim 14, wherein the second tag message is a an imawake message including a start of message character, a message identification character, a random number and bit-wise compliment of the random number.

17. A target in accordance with claim 14, wherein the wake-up message includes a start of message character, a message identification character, and random number.

18. A target in accordance with claim 14, wherein the pong-valid message includes a validity indication message and the pong-invalid message includes an invalidity indication message.

19. A target in accordance with claim 14, wherein the target controller comprises a message generator coupled to the transmitter, the message generator adapted to generate the wake-up message, the pong-valid message and the pong-invalid message.

20. A target in accordance with claim 19, wherein the message generator comprises:
    an execution and control unit; and
    a memory operably coupled to the execution and control unit, wherein the wake-up message, pong-valid message, and pong-invalid message are stored within the memory and executable by the execution and control unit.

21. A target in accordance with claim 14, wherein the transmitter comprises:
    a coil antenna;
    a modulator/demodulator operably coupled to the target controller and the coil antenna, the modulator/demodulator adapted to modulate the wake-up message, the pong-valid message, and the pong-invalid message.

22. A tag for providing contactless proximity automated data exchange with a target, the tag comprising:
    a tag receiver adapted to receive a wake-up message, a pong-valid message; and a pong-invalid message from the target;
    a tag controller coupled to the receiver and adapted to generate a first ping message in response to the wake-up message, a generate a second ping message in response to the pong-invalid message and adapted to generate an imawake message in re pong-valid message;
    a tag transmitter coupled to the tag controller and adapted to transmit the imawake message, the first ping message after a first random wait period, and the second ping message after a second random wait period;
    wherein each of the first and second the random wait period time is a random wait period determined by each of said tags and is a random multiple between 0 and 7 of a predetermined slot time having a duration of approximately 0.3 milliseconds and exceeding a round-trip time for transmitting a message between the target and said plurality of tags.

23. A tag in accordance with claim 22, wherein the first ping message and the second ping message each include a random number and a bitwise compliment of the random number.

24. A tag in accordance with claim 22, wherein the imawake message comprises:
    a start of message character;
    a message identification character;
    a random number; and
    a bit-wise compliment of the random number.

25. A tag in accordance with claim 24, wherein the pong-valid message includes a validity indication message and the pong-invalid message includes an invalidity indication message.

26. A tag in accordance with claim 22 wherein the tag controller comprises:
    a memory adapted to store readable program code corresponding to the first ping message, second ping message and the imawake message, the readable program code executable by the tag controller.

27. A tag in accordance with claim 26, wherein the tag controller further comprises a logic array.

28. A method of managing a non-contact data exchange system including a target and a plurality of tags, the method comprising the steps of:

periodically transmitting a wake-up message from the target;

after a first random period of time, transmitting a first ping message in response to the wake-up message;

determining whether a received message corresponding to the first ping message received at the target is valid to determine w signal collision has occurred;

if the received message is valid, transmitting a pong-valid message from the target;

if the received message is invalid, transmitting a pong-invalid message from the target, after a second random period of time, transmitting a second ping message to the target in response to the invalid-pong message; and transmitting an imawake message to the target in response to the pong-valid message;

wherein each of the first and second the random period is a random multiple in a range from 0 to 7 of a predetermined slot time approximately 0.3 milliseconds in duration and exceeding a round-trip time for transmitting a message between the target and said plurality of tags.

29. A method in accordance with claim 28, wherein the first ping message and the second ping message each include a random number and a bitwise compliment of the random number.

30. A method in accordance with claim 28, wherein the imawake message comprises:

a start of message character;

a message identification character;

a random number; and a bit-wise compliment of the random number.

31. A method in accordance with claim 28, wherein the pong-valid message includes a validity indication message and the pong-invalid message includes an invalidity indication message.

32. A method of managing a non-contact data exchange system including a target and a purality of tags, wherein the method is performed within the target, the method comprises the steps of:

periodically transmitting a wake-up message;

receiving a first ping message transmitted after a first random period of time;

transmitting a pong-valid message if the ping message is valid; transmitting a pong-invalid message if the first ping message is invalid;

receiving a second ping message transmitted after a second random period of time in response to the pong-invalid message;

receiving an imawake message transmitted in response to the pong-valid message;

wherein each of the first and second the random period is a random multiple in a range from 0 to 7 of a predetermined slot time approximately 0.3 milliseconds in duration and exceeding a round-trip time for transmitting a message between the target and said plurality of tags.

33. A method in accordance with claim 32, wherein the first ping message and the second ping message each include a random number and a bitwise compliment of the random number.

34. A method in accordance with claim 32, wherein the imawake message comprises:

a start of message character;

a message identification character;

a random number; and a bit-wise compliment of the random number.

35. A method in accordance with claim 32, wherein the pong-valid message includes a validity indication message and the pong-invalid message includes an invalidity indication message.

36. A method of managing a non-contact data exchange system including a target and a plurality of tags, wherein the method is performed within at least one of the plurality of tags, the method comprises the steps of:

receiving a first message from the target;

waiting for a random time period; remaining silent if any other message from the target during the random time period; transmitting a first tag message to the target at the expiration of the random time period; receiving a second message from the target; transmitting a second tag message to the target if the second message from the target indicated that the first tag message was validly received by the target; and otherwise, returning to the step of transmitting the first tag message;

wherein random wait period is a random multiple in a range from 0 to 7 of a predetermined slot time approximately 0.3 milliseconds in duration and exceeding a round-trip time for transmitting a message between the target and said plurality of tags.

37. A method in accordance with claim 36, wherein the first tag message is a ping message including a random number and a bitwise compliment of the random number.

38. A method in accordance with claim 36, wherein the second tag message is an imawake message comprising:

a start of message character;

a message identification character;

a random number; and a bit-wise compliment of the random number.

* * * * *